United States Patent
Hooper et al.

(10) Patent No.: US 12,423,189 B2
(45) Date of Patent: Sep. 23, 2025

(54) POINT-IN-TIME BACKUP OF APPLICATION DATA STORED ON DISPARATE STORAGE SYSTEMS

(71) Applicant: INTERNATIONAL BUSINESS MACHINES CORPORATION, Armonk, NY (US)

(72) Inventors: Robert C. Hooper, Markham (CA); Christian Garcia-Arellano, Richmond Hill (CA); Alexander Cheung, North York (CA); Hamdi Roumani, Toronto (CA); David Kalmuk, Markham (CA); Ketan Rampurkar, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 18/403,250

(22) Filed: Jan. 3, 2024

(65) Prior Publication Data

US 2025/0217235 A1     Jul. 3, 2025

(51) Int. Cl.
*G06F 11/14*     (2006.01)
*G06F 16/22*     (2019.01)

(52) U.S. Cl.
CPC ...... *G06F 11/1458* (2013.01); *G06F 16/2246* (2019.01); *G06F 2201/84* (2013.01)

(58) Field of Classification Search
CPC ............. G06F 11/1458; G06F 16/2246; G06F 2201/84
USPC ....................................................... 711/162
See application file for complete search history.

(56) References Cited

U.S. PATENT DOCUMENTS

| | | | |
|---|---|---|---|
| 9,983,815 B1* | 5/2018 | Brown | G06F 3/0619 |
| 10,235,066 B1* | 3/2019 | Chen | G06F 3/0619 |
| 10,409,493 B1* | 9/2019 | Kucherov | G06F 3/0653 |
| 10,664,358 B1* | 5/2020 | Chen | G06F 3/0619 |
| 10,733,053 B1* | 8/2020 | Miller | G06F 11/1088 |
| 11,003,542 B1* | 5/2021 | Kucherov | G06F 11/1471 |
| 11,392,557 B1* | 7/2022 | Fuller | G06F 11/1461 |
| 11,467,913 B1* | 10/2022 | Karr | G06F 3/0689 |
| 11,698,884 B2 | 7/2023 | Quinn | |
| 11,953,996 B1* | 4/2024 | Yadav | G06F 11/1458 |
| 2004/0153615 A1* | 8/2004 | Koning | G06F 16/10 714/E11.125 |
| 2015/0301906 A1* | 10/2015 | Crockett | G06F 11/1466 714/19 |
| 2017/0075774 A1* | 3/2017 | Beeken | G06F 11/1469 |
| 2018/0181311 A1 | 6/2018 | Elisha | |
| 2018/0189122 A1* | 7/2018 | Jobi | G06F 9/455 |
| 2019/0370249 A1 | 12/2019 | Batchu | |
| 2020/0012637 A1 | 1/2020 | Strauss | |

(Continued)

*Primary Examiner* — Reginald G Bragdon
*Assistant Examiner* — Aaron D Ho
(74) *Attorney, Agent, or Firm* — Eric W. Chesley

(57) ABSTRACT

Described are techniques for creating a point-in-time backup of application data stored on disparate storage systems. The techniques include initiating a snapshot of the first datastore. The techniques further include initiating a suspension of delete operations at the second datastore to preserve immutable application data stored on the second datastore. The techniques further include initiating a background copy of the second datastore. The techniques further include initiating a resumption of the delete operations at the second datastore in response to completion of the background copy of the second datastore.

20 Claims, 7 Drawing Sheets

(56) References Cited

U.S. PATENT DOCUMENTS

| | | | | |
|---|---|---|---|---|
| 2022/0035537 | A1* | 2/2022 | Dillaman | G06F 3/0604 |
| 2022/0091942 | A1* | 3/2022 | Mukku | G06F 11/1464 |
| 2023/0229316 | A1* | 7/2023 | Flag | G06F 3/0634 |
| 2023/0281084 | A1* | 9/2023 | Xiang | G06F 3/0652 |
| | | | | 707/692 |
| 2023/0385304 | A1* | 11/2023 | Pogde | G06F 16/134 |
| 2024/0232134 | A1* | 7/2024 | Katuri | G06F 16/128 |
| 2024/0248630 | A1* | 7/2024 | Liu | G06F 3/0619 |
| 2024/0311170 | A1* | 9/2024 | Rogers | G06F 9/45558 |

* cited by examiner

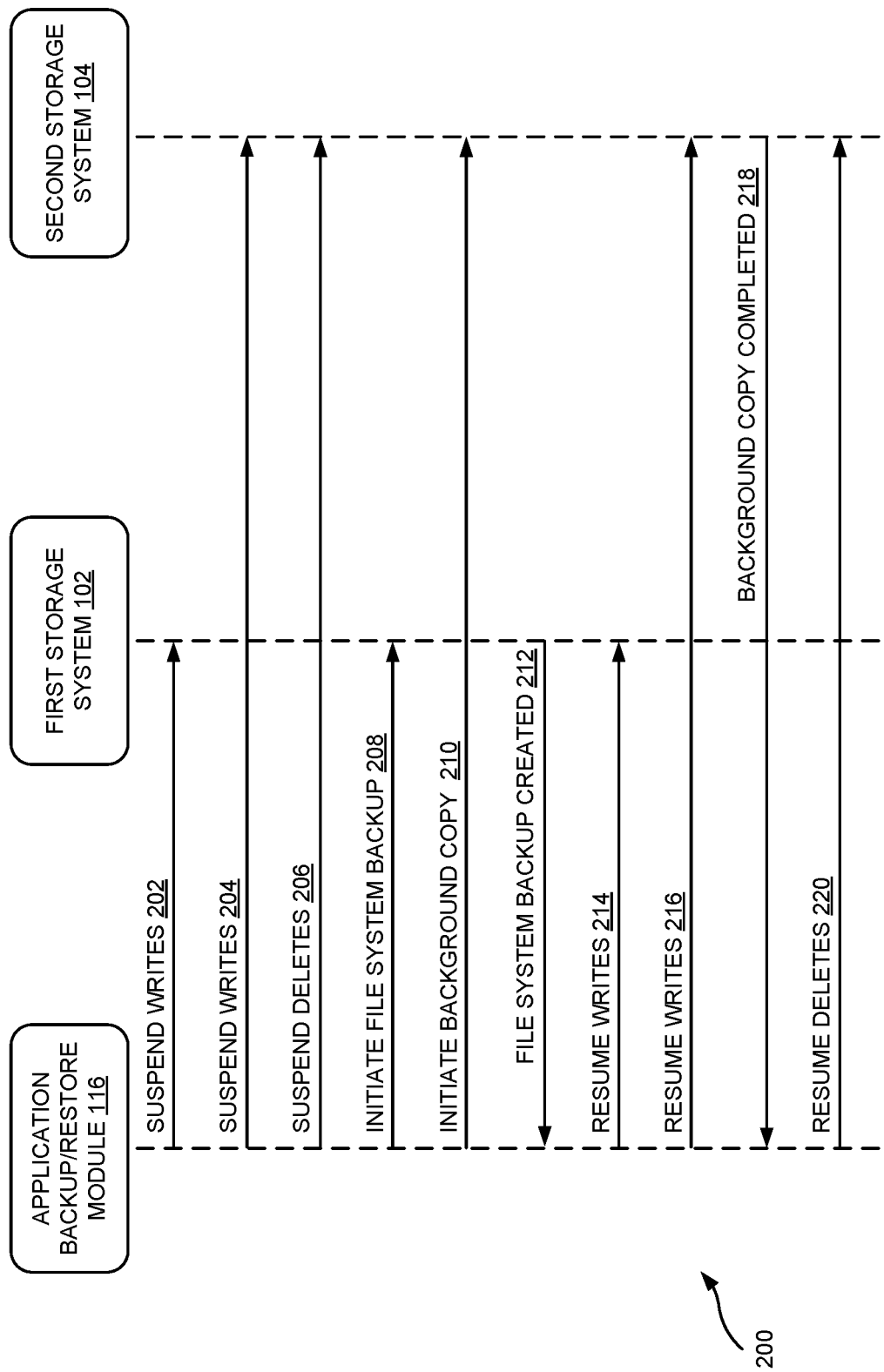

POINT-IN-TIME BACKUP OF APPLICATION DATA STORED ON DISPARATE STORAGE SYSTEMS

BACKGROUND

The present disclosure relates to data management, and, more specifically, to point-in-time backup and recovery of application data.

Point-in-time recovery (PITR) is a data protection technique that enables the restoration of application data to a specific point-in-time. PITR comprises a data protection technique that is performed by taking periodic backups of application data and storing the backups for a predetermined retention period. In the event of data loss or corruption, the application data can be restored to a specific point-in-time within the retention period using a backup of application data that corresponds to the point-in-time, which can minimize downtime of the application and prevent data loss that results from the downtime. Performing the PITR can include identifying a backup from the desired point-in-time and restoring the application data contained in the backup to a production datastore utilized by the application.

SUMMARY

Aspects of the present disclosure are directed toward a system for creating a point-in-time backup of application data stored on both a first datastore and a second datastore, where the application data stored on the second datastore is immutable application data. The system being configured to initiate a snapshot of the first datastore. The system being further configured to initiate a suspension of delete operations at the second datastore to preserve the immutable application data stored on the second datastore. The system being further configured to initiate a background copy of the second datastore. The system being further configured to initiate a resumption of the delete operations at the second datastore in response to completion of the background copy of the second datastore.

Additional aspects of the present disclosure are directed to computer-implemented methods and computer program products configured to perform the operations described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 2 is a sequence diagram that illustrates an example method for creating a point-in-time backup of application data stored on a first storage system and a second storage system, in accordance with some embodiments of the present disclosure.

Figure 1:
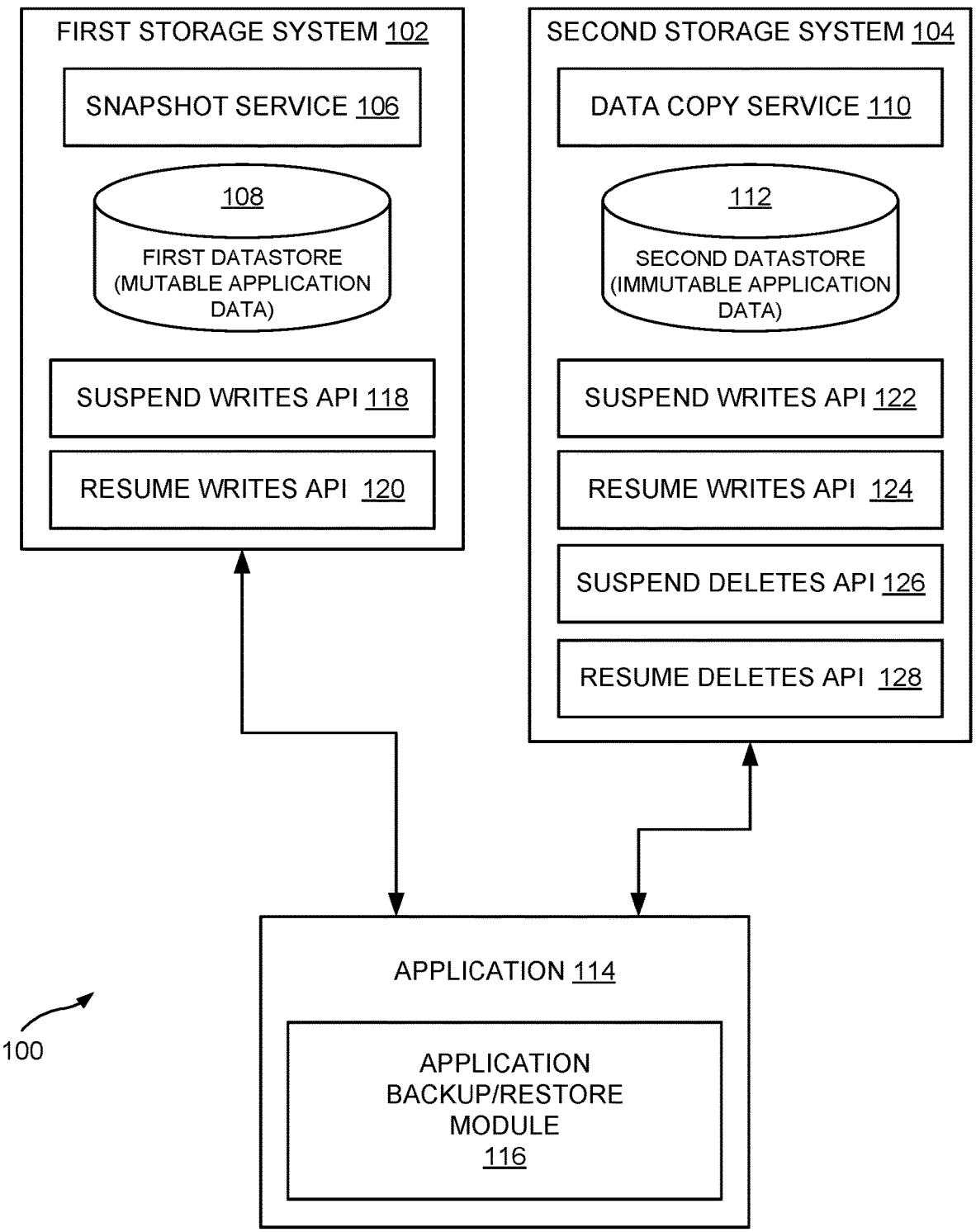
FIG. 1 is a block diagram illustrating an example computational environment implementing point-in-time backups of application data stored on disparate storage systems, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward creating a point-in-time backup of application data stored on disparate storage systems. While not limited to such uses, embodiments of the present disclosure may be better understood in light of the aforementioned context.

Many applications utilize multiple storage systems for storing application data. The storage systems utilized by an application can be disparate, meaning that data formats used by the storage systems are different. As an example, an application may utilize a block storage system and an object storage system to store application data. A point-in-time backup and restore approach for the application needs to be able to create a point-in-time backup of each storage system containing application data so that, in the event of an interruption in service, the application is able to be recovered to a state that was prior to the time of the interruption.

Advantageously, aspects of the present disclosure overcome the challenges described above by utilizing a snapshot tool feature of a datastore system (e.g., block storage) to generate a point-in-time backup of application data stored on a first datastore, while using a different method to generate a point-in-time backup of a second datastore containing immutable application data that does not rely on a service-provider technique that attempts to provide point-in-time snapshot-like behavior (e.g., object versioning).

According to an aspect of the present disclosure, there is provided a system including one or more computer readable storage media storing program instructions and one or more processors which, in response to executing the program instructions, are configured to create a point-in-time backup of application data stored on both a first datastore and a second datastore, where the application data stored on the second datastore is immutable application data. The program instructions for creating the point-in-time backup cause the one or more processors to initiate a snapshot of the first datastore, initiate a suspension of delete operations at the second datastore to preserve the immutable application data stored on the second datastore, initiate a background copy of the second datastore, and initiate a resumption of the delete operations at the second datastore in response to completion of the background copy of the second datastore.

Accordingly, the system captures, at a consistent point-in-time, a backup of application data stored on both the first datastore and the second datastore. Capturing a backup of the application data stored on both datastores, at a consistent point-in-time, advantageously provides the ability to recover the application to the time of the backup. Moreover, suspending delete operations during a background copy of immutable application data advantageously preserves the immutable application data that existed at the time the backup is started, which ensures that the backup of the immutable application data on the second datastore includes the data needed to successfully recover the application to the time of the backup.

According to an aspect of the system, the program instructions are further configured to cause the one or more processors to initiate suspension of write operations at the first datastore and the second datastore at a start of creating the point-in-time backup, and initiate resumption of the write operations at the first datastore and the second datastore in response to creation of the snapshot of the first datastore. Allowing the write operations to resume after creating the snapshot (which can be created within just a few seconds) advantageously decreases an interruption of service of the application that occurred when the write operations were suspended.

According to an aspect of the system, the program instructions are configured to cause the one or more processors to initiate the resumption of the write operations during performance of the background copy of the immutable application data to allow application input/output to resume. Allowing the resumption of write operations at the second datastore during a time that the background copy of the immutable application data is being performed advantageously decreases an interruption of service of the application because allowing writes at the first and second datastores enables the application resume input/output operations.

According to an aspect of the system, the program instructions configured to cause the one or more processors to initiate the background copy of the immutable application data are further configured to cause the one or more processors to obtain a list of files containing the immutable application data stored on the second datastore to include in the point-in-time backup, and provide the list to a data copy service that performs the background copy of the immutable application data. Providing the list of files containing the immutable application to the data copy service advantageously reduces the amount of data to be copied by the background copy, which reduces the amount of time to perform the background copy, and advantageously reduces an amount of storage needed to store a copy of the immutable application created by the background copy.

According to an aspect of the system, the list of files containing the immutable application data is maintained on the first datastore to indicate a current state of the immutable application data stored on the second datastore. Maintaining the list on the first datastore advantageously enables the list to be included in a file snapshot of the first datastore, thereby preserving the list in the file snapshot, which can be used to restore the application to an accurate state indicated by the list.

According to an aspect of the system, the list of files containing the immutable application data comprises a manifest of a log-structured merge tree (LSMT) that provides indexed access to the immutable application data stored on the second datastore. The use of the LSMT manifest advantageously reduces an amount of computing resources that would otherwise be used to maintain the list of files. That is, when the second datastore is implemented using an LSMT, the manifest file, which contains metadata for the files stored on the second datastore, already exists, and as such, there is no need for the system to maintain another list of the files stored on the second datastore.

According to an aspect of the system, the list of files containing the immutable application data is maintained on the second datastore, and the suspension of delete operations at the second datastore includes suspending deletion of the list. Maintaining the list on the second datastore where the files containing the immutable application data reside, advantageously conserves computing resources that would otherwise be used to maintain the list on the first datastore. Moreover, including the list in a suspension of delete operations advantageously preserves the list for use in restoring the application if needed.

According to an aspect of the system, the program instructions configured to cause the one or more processors to initiate the resumption of the delete operations at the second datastore are further configured to cause the one or more processors to initiate a catchup process that deletes obsolete immutable application data that has been replaced by new immutable application data written to the second datastore during performance of the background copy. Performing the catchup process advantageously increases available storage space on the second datastore that had been occupied by the obsolete immutable application data.

According to an aspect of the system, the program instructions are further configured to cause the one or more processors to perform a point-in-time recovery of the application data using the point-in-time backup of the application data. Performing the point-in-time recovery includes initiating restoration of the mutable application data from the snapshot on the first datastore, and initiating restoration of the immutable application data on the second datastore from a copy created by the background copy. Recovering the application using the snapshot of the mutable application data, together with the copy of the immutable application data, advantageously restores both the first and second datastore to a same point-in-time (or substantially same point-in-time), thereby decreasing an amount of time and resources that would otherwise be used to restore the application if the point-in-time backup of the application data did not exist.

A particular application of an embodiment of the system described above can be creating point-in-time backups of an application that stores application data on both a data warehouse and an object storage system. For example, the system can create a snapshot of the application data stored on the data warehouse and create a copy of the application data stored on the object storage system, thereby creating a point-in-time backup of the application data.

Additional aspects of the present disclosure are directed to computer-implemented methods and computer program products configured to perform any of the functionality of any of the aspects of the aforementioned system, thereby realizing the associated advantages, improvements, and/or technical effects, previously described.

Referring now to the figures, FIG. 1 illustrates a block diagram of an example computational environment 100 that can implement point-in-time backups of application data stored on disparate storage systems, in accordance with some embodiments of the present disclosure. As illustrated, the computation environment 100 can include an application 114 configured to interface with both a first storage system 102 and a second storage system 104 to store and access application data contained on one or more first datastores 108 and second datastores 112. As will be appreciated, a determination of where application data is stored (e.g., on the first storage system 102 or on the second storage system 104) is a design choice and is not described herein.

The application 114 can comprise a computer program that performs tasks in association with the application data. For example, the application 114 can be a cloud hosted application (e.g., a software application hosted on one or more cloud computing servers that is accessible over a network), or an on-premises application (e.g., a software application installed on a company's own hardware infrastructure). Illustratively, the application 114 can be an e-commerce application, an enterprise resource planning application, a customer relationship management application, a productivity application, a communication application, and the like. Application data created or used by the application 114 can be any data, including, but not limited to, user data and system data.

Application data stored on the first storage system 102 can be stored using any data format. In order to illustrate the aspects of the disclosure, FIG. 1 illustrates the first storage system 102 as utilizing a mutable data format to store application data on the one or more first datastores 108. However, it will be understood that the application data stored on the first datastore 108 can be stored using another data format. A mutable data format is a database structure that allows the application data to be changed after being stored to a first datastore 108. Any data changes made to the application data overwrite the previous value of the application data. That is, the value of the application data can be modified without creating a new data object. One example of a storage system that can be used to implement the first storage system 102 is a block storage system, where block storage, or block-level storage, stores application data on storage area networks (SANs) or cloud-based storage environments. In some examples, the first storage system 102 can comprise network-attached block storage that is managed by a service provider, such as, but not limited to, IBM® Spectrum Accelerate™, Amazon Web Services® Elastic Block Store (EBS), Azure® Disk Storage, Google® Cloud Persistent Disk, and the like. For the sake of clarity, application data stored on the first storage system 102 will be referred to hereafter as "mutable application data".

As shown in FIG. 1, the first storage system 102 can include a snapshot service 106 for creating point-in-time snapshots of a first datastore 108 (or a plurality of first datastores 108, as will be appreciated), which are managed by the first storage system 102. Generally, a point-in-time snapshot of the mutable application data stored on a first datastore 108 can be created while still making the first datastore 108 accessible to the application 114. For example, creation of the snapshot can occur asynchronously, such that the point-in-time snapshot can be created immediately, while the status of the snapshot is pending until the snapshot is complete (e.g., when all of the modified blocks have been preserved).

The second storage system 104 manages one or more second datastores 112 for storing application data in an immutable format, referred to hereafter as "immutable application data". Immutable application data stored on the second storage system 104 cannot be modified. Consequently, in order to modify a value of immutable application data stored on the second storage system 104, a new data object representing the modified value is created, and the obsolete data object representing the old value is deleted. One example of a storage system that can be used to implement the second storage system 104 is an object storage system. Object storage is a type of data storage that stores data as objects. Objects are self-contained units of data that include the data itself, metadata, and a unique identifier. Objects stored on an object storage system are immutable. In some examples, the second storage system 104 can comprise a storage service managed by a service provider, such as, but not limited to, IBM Cloud® Object Storage, AWS® S3, Azure® Blob Storage, Google Cloud Storage™, and the like.

As illustrated in FIG. 1, the second storage system 104 includes a data copy service 110. The data copy service 110 creates on-demand backup copies of immutable application data stored on the second datastore 112. As background, some immutable data storage systems, such as object storage systems, implement service-provider techniques to provide point-in-time snapshot-like behavior, such as object versioning or on-demand incremental backups. However, these service-provider implemented techniques are costly, because they maintain a copy of every version of every object existing in a datastore beginning from the earliest desired restore point-in-time, which in practice typically means maintaining a copy of every version of every object in the datastore at all times. Alternatively, using service-provider implemented on-demand incremental backups alone is also costly, since all the required files are copied at once (on-demand), which usually takes a very long time to run, while applications are offline waiting, and these implementations typically do not guarantee any point-in-time for recovery. In order to overcome the issues associated with these service-provider implemented techniques, aspects of the present disclosure employ the data copy service 110 to create an on-demand point-in-time copy (or incremental copy) of immutable application data stored on the second datastore 112, in concert with employing the snapshot service 106 to create a point-in-time snapshot of mutable application data stored on the first datastore 108.

In the embodiment shown in FIG. 1, an application backup/restore module 116 implements a point-in-time backup method. The point-in-time backup method captures backups of application data on disparate storage systems, at a consistent point-in-time, which can be used together to safely restore the application 114 to the point-in-time as if the backups were a single snapshot of the application data. As will be described below, the point-in-time backup method implemented by the application backup/restore module 116 minimizes any disruption of service of the application 114 by only suspending write operations at the first and second storage systems 102/104 for a time that allows both, a snapshot of the mutable application data on the first datastore 108, and a background copy of the immutable application data on the second datastore 112 to be initiated. Thereafter, the application 114 can resume write operations at the first and second storage systems 102/104 while the copy of the immutable application data completes in the background, resulting in minimal disruption of the application 114. Although FIG. 1 depicts the application backup/restore module 116 as a component of the application 114, it will be appreciated that the application backup/ restore module 116 can comprise a standalone service that can be provided to users to create point-in-time backups of the users' application data.

With continuing reference to FIG. 1, FIG. 2 illustrates one example of a sequence of operations 200 that can be performed by the application backup/restore module 116 to create a point-in-time backup of the application data stored on the first and second storage systems 102/104. As referred to herein, a point-in-time backup comprises both a backup of application data stored on a first datastore 108 and a backup of application data stored on a second datastore 112, where the two backups are captured at substantially the same point-in-time.

Starting in operations 202 and 204, the application backup/restore module 116 suspends write operations at both the first and second storage systems 102. In some embodiments, to establish a point-in-time for the backups of the application data, operations 202 and 204 can be performed at substantially the same time (e.g., in parallel).

In some embodiments, the application backup/restore module 116 suspends write operations directed to writing mutable application data to the first datastore 108 by sending an application programming interface (API) request to the first storage system 102, which exposes a suspend writes API 118 that blocks writes of mutable application data to the first datastore 108 (e.g., by caching the writes or by denying the application 114 write access to the first datastore 108). Also, in some embodiments, the application backup/restore module 116 suspends write operations directed to writing immutable application data to the second datastore 112 by sending an API request to the second storage system 104, which exposes a suspend writes API 122 configured to block writes of immutable application data to the second datastore 112 (e.g., by caching the writes or by denying the application 114 write access to the second datastore 112).

In addition to suspending write operations at the second storage system 104, the application backup/restore module 116, in operation 206, suspends delete operations directed to deleting existing immutable application data (e.g., objects) stored at the second storage system 104. Suspending the delete operations ensures that immutable application data that exists at the time that the point-in-time backup is initiated is preserved and will be included in the point-in-time backup of the immutable application data. In some embodiments, the application backup/restore module 116 suspends the delete operations by sending an API request to the second storage system 104, which exposes a suspend deletes API 126 that blocks deletions of immutable application data stored on the second datastore 112.

After suspending write operations at the first and second storage systems 102/104, the application backup/restore module 116, in operations 208 and 210, initiates the point-in-time backups of the mutable and immutable application data. Namely, in operation 208, the application backup/restore module 116 initiates a file system backup of the mutable application data stored on the first datastore 108 by sending a request to the snapshot service 106. The snapshot service 106 can comprise a backup tool that is provided as part of the first storage system 102 (e.g., a feature of the first storage system 102), and the snapshot service 106 can manage the aspects of creating snapshots of the first datastore 108, maintaining the snapshots, and restoring the first datastore 108 to a point-in-time of a snapshot. In response to receiving the request from the application backup/restore module 116, the snapshot service 106 creates a point-in-time file system backup (snapshot) of the mutable application data contained on the first datastore 108. As described earlier, creating the file system backup can occur asynchronously, such that a point-in-time file system backup of the mutable application data can be created immediately, and backup of the file system can continue in the background until complete, allowing for ongoing reads and writes of mutable application data at the first datastore 108.

Referring now to the second storage system 104, which comprises an immutable data storage system (e.g., object storage system), as described earlier, some immutable data storage systems implement service-provider techniques to provide point-in-time snapshot-like behavior (e.g., object versioning or on-demand incremental backups). However, these service-provider implemented techniques are not suitable for creating a point-in-time backup of application data stored on disparate storage systems where at least one of the storage systems uses an immutable data format. As such, these service-provider implemented techniques are not used to create a point-in-time backup of the immutable application data contained on the second datastore 112. Rather, aspects of the present disclosure create an on-demand copy of the immutable application data in the background, which allows application input/output to be performed while the background copy executes, as is described in the following.

In operation 210, the application backup/restore module 116 initiates a background copy of the immutable application data stored on the second datastore 112. To enable capture of point-in-time application data stored on the second storage system 104, the application backup/restore module 116 maintains a list of files on the second datastore 112 that contain application data. The list of files (hereafter "file listing") identifies the files containing point-in-time application data on the second storage system 102 that are accessed by the application 114. In some embodiments, the file listing can comprise indexes to the files on the second datastore 112.

Figure 3A:
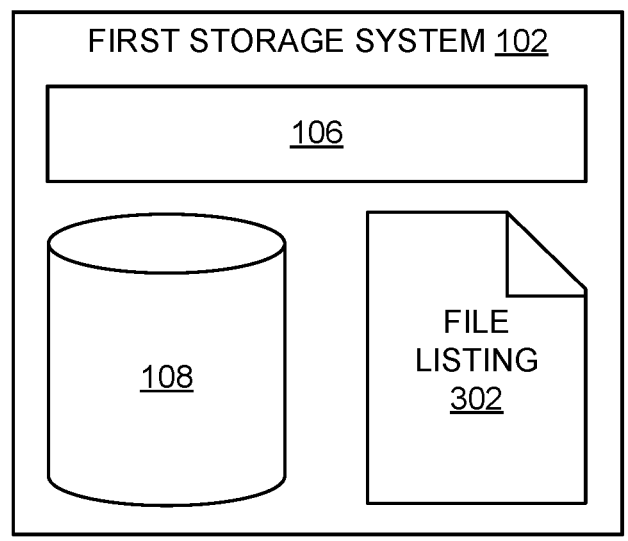
FIG. 3A and FIG. 3B are block diagrams illustrating example computational environments for maintaining a file listing that provides indexed access to immutable application data stored on a second datastore, in accordance with some embodiments of the present disclosure.
Figure 3B:
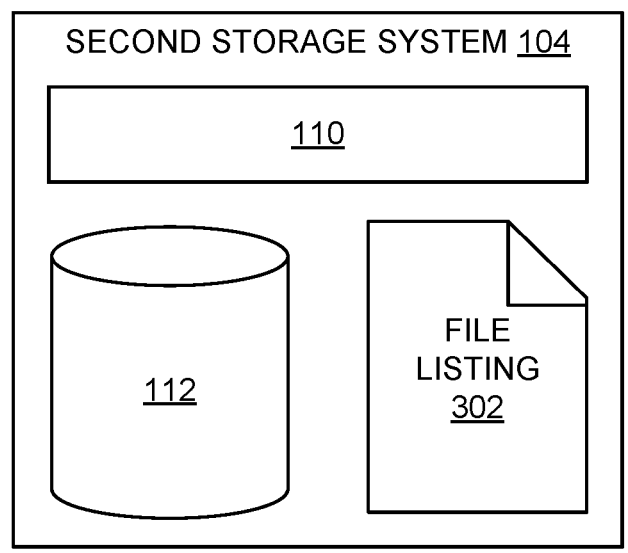

As shown in FIG. 3A, in some embodiments, the file listing 302 can be maintained on the first storage system 102. In some embodiments, the second storage system 104 can be implemented using a log-structured merge tree. A log-structured merge-tree (also known as an LSM tree, or LSMT) is a data structure with performance characteristics that make it attractive for providing indexed access to files with high insert volume, such as transactional log data. LSMTs, like other search trees, maintain key-value pairs. In embodiments where the second storage system 104 is implemented using an LSMT, the file listing 302 comprises a manifest file (or the like), which contains metadata for the files stored on the second storage system 104. The manifest file can be copied to the first storage system 102, and when performing a point-in-time backup, the copy of the manifest file can be captured so that the information in the manifest file can be used at a later time to restore the application 114 to the point-in-time. Alternatively, as shown in FIG. 3B, the file listing 302 can be maintained on the second storage system 104. In embodiments where the second storage system 104 is implemented using an LSMT, the file listing 302 comprises a manifest file containing metadata for the files, and when performing a point-in-time backup, a copy of the manifest file can be preserved on the second storage system 104 (e.g., as part of a point-in-time backup of the second datastore 112) so that the information in the manifest file can be used at a later time to restore the application 114 to the point-in-time.

Returning to operation 210, as part of initiating the background copy, the application backup/restore module 116 identifies the files stored on the second datastore 112 that contain application data that are to be backed up using the file listing 302 (e.g., manifest file). A copy of the second datastore 112 created by the background copy can be a full copy or an incremental copy, as will be appreciated. In some embodiments, the application backup/restore module 116 initiates the background copy by sending a request to the data copy service 110. The request can include the file listing 302. In response to receiving the request, the data copy service 110 starts an on-demand backup copy of immutable application data, which can be identified from the file listing 302. Unlike creating a snapshot of mutable application data, where a point-in-time file system backup can be created quickly (e.g., in seconds), creating a copy of immutable application data can take a long time to complete (e.g., tens of minutes or longer). To avoid prolonged disruption of the application 114, the point-in-time backup method employed by the application backup/restore module 116 suspends delete operations at the second storage system 104 (as described in association with operation 206 above) to protect the immutable application data that exists at the start of the point-in-time backup from being deleted, and with the immutable application data being safe from deletion, point-in-time backup method starts a background copy of the immutable application data. For example, the data copy service 110 can execute in the background to create the point-in-time backup of the immutable application data to allow other second storage system processes to be executed during the creation of the point-in-time backup, as will be described further below.

Also, as part of performing the point-in-time backup, a version of a file listing (described previously in association with FIG. 3A and FIG. 3B) that exists at the time of the backup can be preserved, so that in the event that the application 114 needs to be restored to the point-in-time of the backup, the file listing can be used to restore the application data contained in the backup to the second storage system 104. For example, should the application 114 need to be restored, the application backup/restore module 116 can reference the file listing to restore the point-in-time copy of the immutable application data to the second datastore 112.

In operation 212, the application backup/restore module 116 receives an indication that the file system backup of the mutable application data stored on the first datastore 108 has been created. As described earlier, the file system backup is asynchronous, and as such, creation of the file system backup of the mutable application data allows for writes to the first datastore 108 to resume. Accordingly, in response to receiving the indication that the file system backup has been created, the application backup/restore module 116 in operations 214 and 216 resumes writes to the first and second datastores 108/112. In some embodiments, the application backup/restore module 116 calls resume writes APIs 120/124, which are exposed by the first and second storage systems 102/104. In response to being called, the resume writes APIs 120/124 allow write operations to again be performed on the first and second datastores 108/112.

Accordingly, even though the background copy of the immutable application data on the second datastore 112 may be ongoing, write operations are allowed because, unlike a write of mutable application data, a write of immutable application data does not overwrite the existing immutable application data. For example, in the case of an object storage system, objects can be created and deleted, but not modified. That is, when updating a file stored in an object storage system, the update to the file does not modify an existing object. Instead, a new object is created and the old object is deleted. Thus, the point-in-time backup method employed by the application backup/restore module 116 can allow writes to the second datastore 112 to resume because the existing immutable application data is protected via the suspension of delete operations, therefore new immutable application data written to the second datastore 112 will not overwrite (modify) the existing immutable application data that is being copied via the background copy initiated in association with operation 210.

In operation 218, the application backup/restore module 116 receives an indication that the background copy of the immutable application data stored on the second datastore 112 has completed. In response, the application backup/restore module 116 allows deletes of immutable application data to resume at the second storage system 104. In some embodiments, the application backup/restore module 116 resumes delete operations by sending an API request to the second storage system 104, which exposes a resume deletes API 128. In response to the API request, the resume deletes API 128 unblocks deletions of the immutable application data stored on the second datastore 112. Allowing the delete operations to resume enables the second storage system 102 to perform a catchup process that deletes obsolete application data that has been replaced by new application data.

Figure 4:
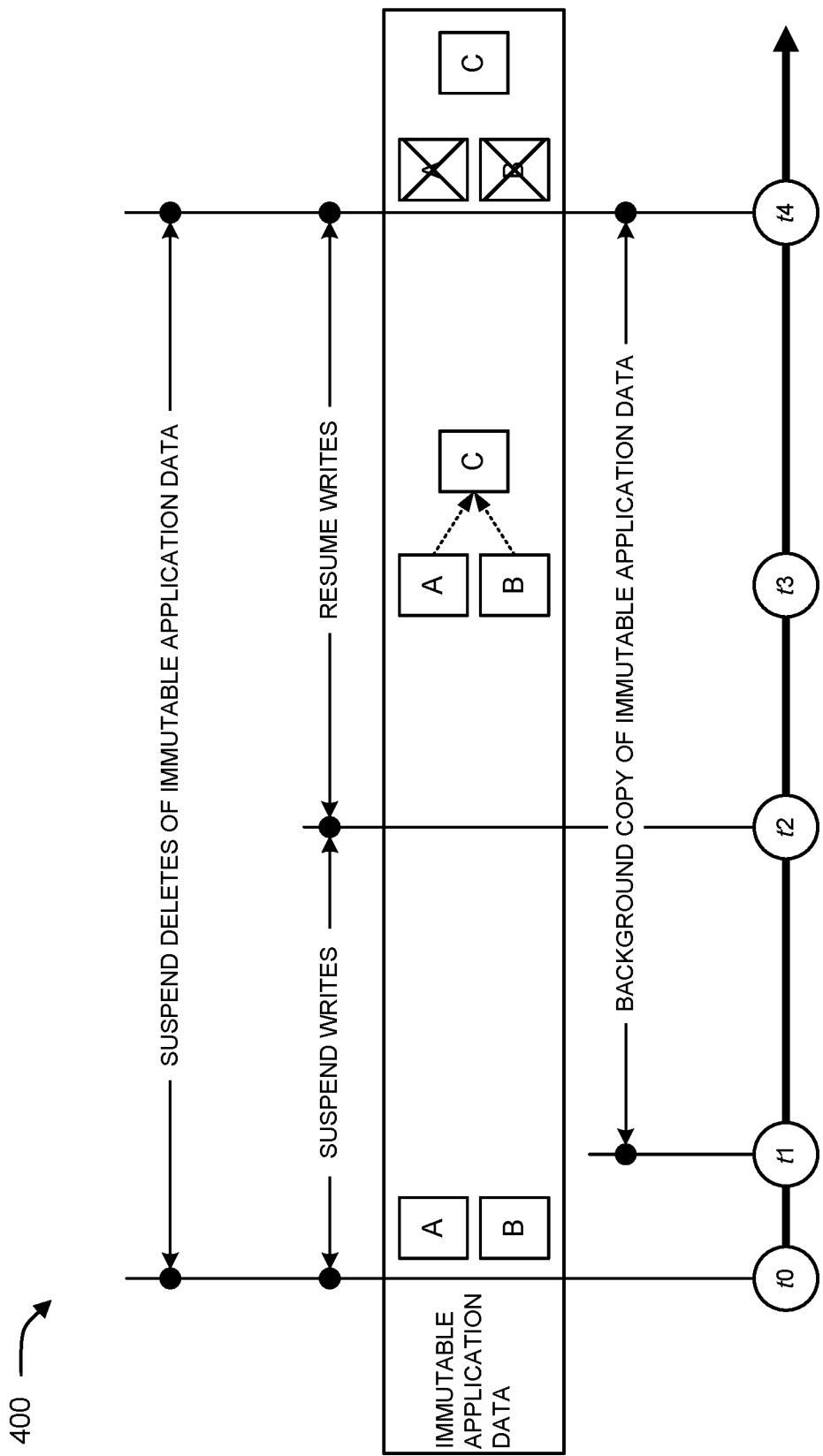
FIG. 4 is a diagram illustrating an example timeline of operations for preserving immutable application data during a background copy of the immutable application data, in accordance with some embodiments of the present disclosure.

As a further illustration of the operations involved in capturing the immutable application data stored on the second datastore 112, the example timeline in FIG. 4 illustrates operations for preserving immutable application data during a background copy of the immutable application data. Starting at t0, a suspension of deletes of immutable application data stored on the second datastore 112 is invoked to prevent immutable application data (e.g., object A and object B) existing at the point-in-time of the backup from being deleted. Also at t0, a suspension of writes is invoked to prevent new immutable application data from being written to the second datastore 112. Thereafter, at t1, a background copy of the immutable application data (e.g., object A and object B) is started. The background copy creates a point-in-time copy of the immutable application data.

At t2, the suspension of writes is revoked and write operations at the second datastore 112 are allowed to resume. The write operations are allowed to resume because, at this point, the immutable application data (e.g., object A and object B) included in the point-in-time backup is protected from being deleted via the suspension of deletes invoked at 10. Moreover, because the application data is immutable, writing new application data to the second datastore 112 does not modify or replace the immutable application data included in the point-in-time backup. For example, as shown at 13, object C is written to the second datastore 112. Although object C is a version of object A and object B, object C does not replace objects A and B. Objects A and B will be persisted on the second datastore 112 until the suspension of deletes is revoked and the objects are deleted.

At t4, the background copy completes. At this point, the immutable application data that existed at the time the background copy was started is preserved in a point-in-time copy, and as such, deletes of obsolete immutable application data can be resumed. In some embodiments, the resumption of delete operations can include performing a catchup process. The catchup process executes any outstanding delete operations that were suspended during performance of the background copy. As an illustration, after t4, the catchup process can now delete objects A and B, which have been replaced by object C. Also, the catchup process can include identifying application data that may have been included in the point-in-time copy, but may fall outside of a time of the point-in-time copy (e.g., newer data that should not have been included in the point-in-time copy), and the catchup process can delete the application data.

Figure 5:
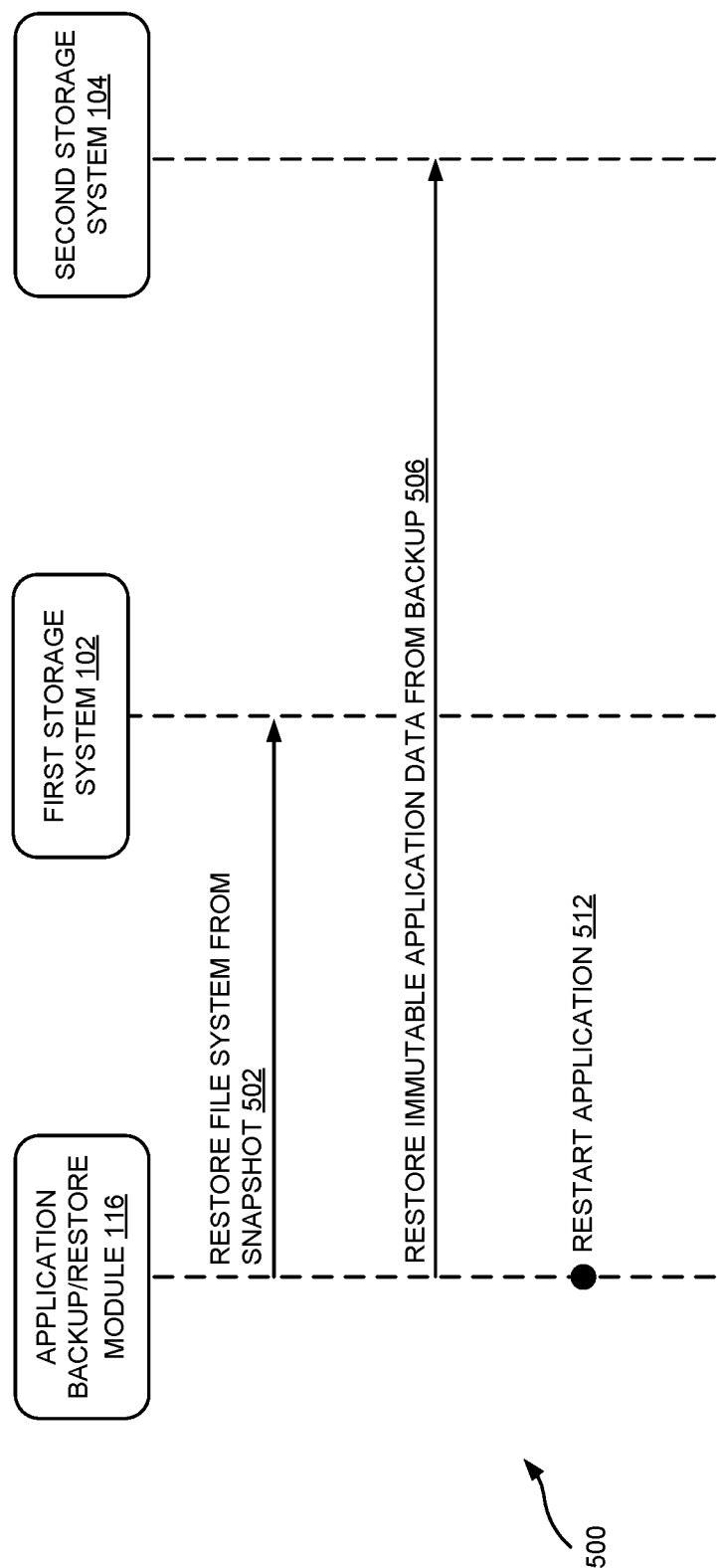
FIG. 5 is a sequence diagram that illustrates an example method for performing a point-in-time recovery of an application using a point-in-time backup, in accordance with some embodiments of the present disclosure.

A backup of the application 114 using the point-in-time backup method described herein can be used to restore the application 114 to a point-in-time working state. With continuing reference to FIG. 1, FIG. 5 illustrates one example of a sequence of operations 500 that can be performed via the application backup/restore module 116 to perform a point-in-time recovery of the application 114 using a point-in-time backup. Illustratively, the sequence of operations 500 can be performed in response to an event that results in the damage or loss of application data. Recovery of the application 114 from the point-in-time backup comprises restoring both a point-in-time backup of mutable application data to the first datastore 108, and a point-in-time backup of immutable application data to the second datastore 112, where both backups are from the same point-in-time.

In some embodiments, the application backup/restore module 116 provides a user interface for restoring the application 114 to a point-in-time using a snapshot of the first datastore 108 and a backup copy of the second datastore 112. A user can restore the application 114 to the point-in-time, via the user interface, by identifying the snapshot of the first datastore 108 and the backup copy of the second datastore 112 that correspond to the point-in-time.

In operation 502, the snapshot of the first datastore 108 is restored on the first storage system 102, and in operation 506, the backup copy of the second datastore 112 is restored on the second storage system 104. As described earlier, a file listing captured at the time that the point-in-time backup was created can be used to identify and restore immutable application data to the second storage system 104. The file listing can include indexes which can be used to restore the immutable application data to the second datastore 112.

After restoring the first datastore 108 and the second datastore 112 to the point-in-time, in operation 512, the application 114 can be restarted. Reinstating the point-in-time application data on the first and second datastores 108/112, and restarting the application 114, restores the application 114 to a point-in-time working state of the reinstated application data.

Figure 7:
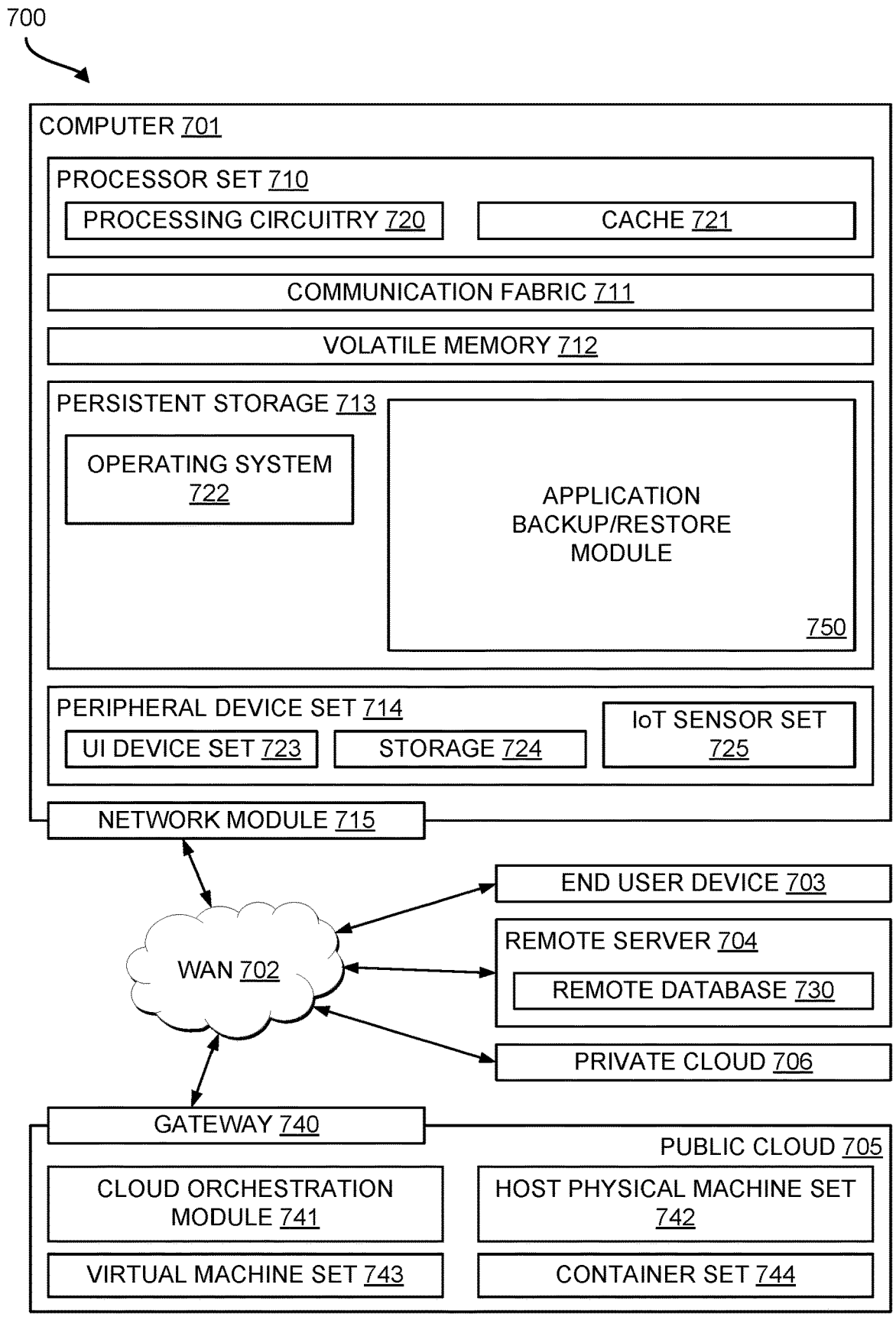
FIG. 7 is a block diagram that illustrates an example computing environment in which aspects of the present disclosure can be implemented, in accordance with some embodiments of the present disclosure.

In the illustrative examples above, the same reference numeral may be used in more than one figure. This reuse of a reference numeral in different figures represents the same element in the different figures. All or a portion of the computational environment 100 shown in FIG. 1 can be implemented, for example by all or a subset of the computing environment 700 of FIG. 7.

Generally, the modules described herein (also referred to as program modules) include routines, programs, components and/or data structures that perform particular tasks and/or implement particular abstract data types. In some embodiments, the modules can be implemented as computing services hosted in a cloud environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules.

As will be appreciated, in some embodiments, a network (e.g., WAN 702 in FIG. 7) can be provided to enable communication between the components of the computational environment 100. The network can include any useful computing network, including an intranet, the Internet, a local area network, a wide area network, a wireless data network, or any other such network or combination thereof. Components utilized for the network can depend at least in part upon the type of network and/or environment selected. Communication over the network can be enabled by wired or wireless connections and combinations thereof.

A datastore comprises a digital repository that stores, manages, and distributes application data. The datastore can include relational databases, non-relational (NoSQL) databases, data warehouses, flat files, simple files, etc. The datastore can comprise any device or combination of devices capable of storing, accessing, organizing and/or retrieving data, which may include any combination and number of data servers, cluster storage systems, data storage devices, in any centralized, distributed, or clustered environment. The storage system components of the datastore may include storage systems such as a SAN (Storage Area Network), cloud storage network, volatile or non-volatile RAM, optical media, or hard-drive type media. The datastore may be representative of a plurality of data stores as can be appreciated.

API calls, procedure calls or other network commands that may be made in relation to the modules and services illustrated herein can be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

Other components in addition to or in place of the ones illustrated may be used. Some components may be unnecessary. Also, blocks are presented to illustrate some functional components. One or more of these blocks may be combined, divided, or combined and divided into different blocks when implemented in an illustrative embodiment. While the figures referenced above illustrate examples of computational environments that can implement the techniques above, many other similar or different environments are possible. The example environments discussed and illustrated above are merely representative and not limiting.

Figure 6:
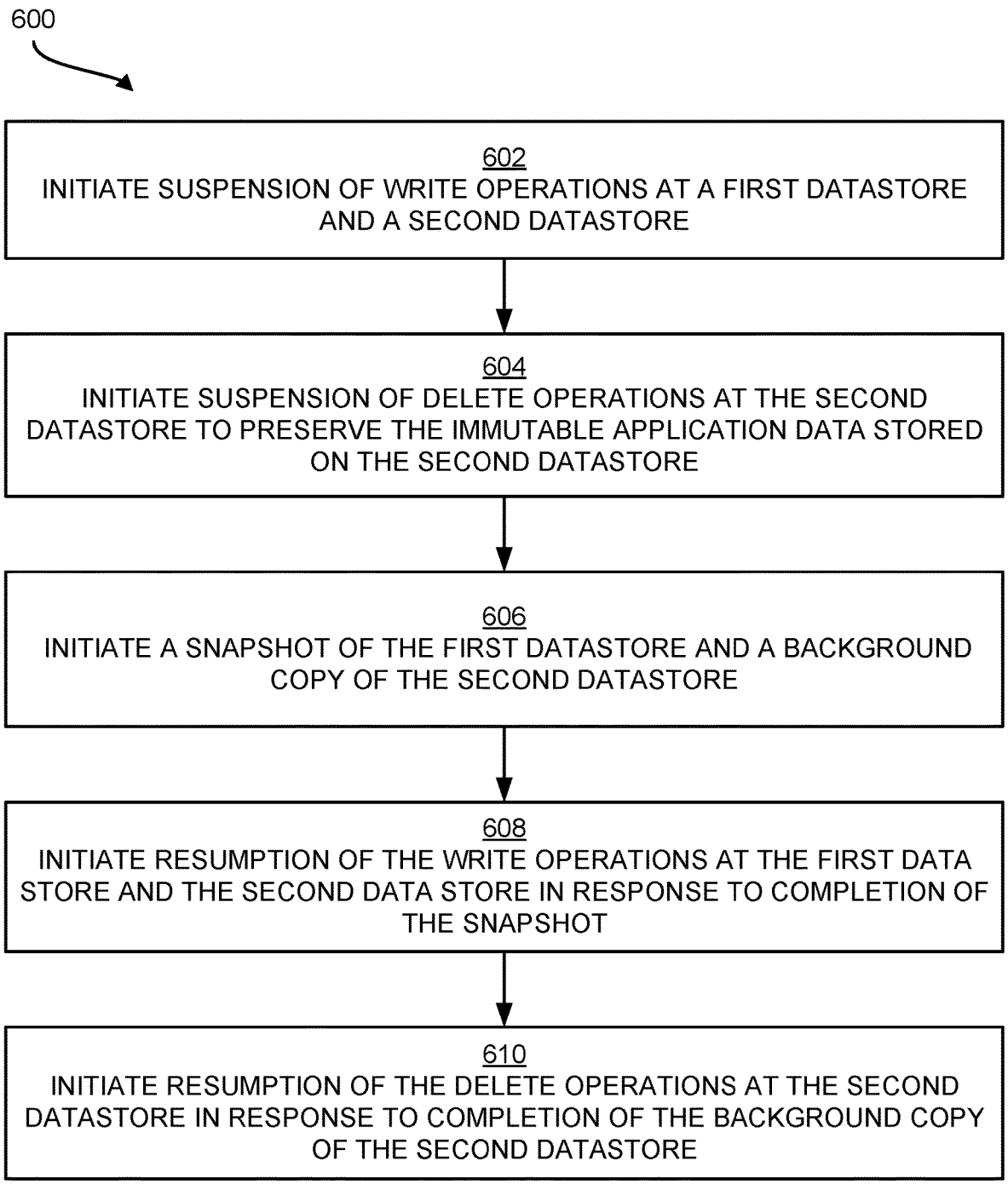
FIG. 6 is a flow diagram illustrating an example method for creating a point-in-time backup of application data stored on disparate datastores, in accordance with some embodiments of the present disclosure.

FIG. 6 is a flow diagram illustrating an example method 600 for creating a point-in-time backup of application data stored on both a first datastore and a second datastore, where the application data stored on the second datastore is immutable application data, in accordance with some embodiments of the present disclosure. In operation 602, a suspension of write operations is initiated at the first datastore and the second datastore. In some embodiments, to establish a point-in-time for the backup, the suspension of write operations at the first and second datastores can be performed at substantially the same time.

In operation 604, a suspension of delete operations is initiated at the second datastore to preserve the immutable application data stored on the second datastore. Suspending the delete operations ensures that immutable application data that exists at the time that the point-in-time backup is initiated is preserved, and that the immutable application data will be included in the backup.

In operation 606, a snapshot (e.g., a file system snapshot) of the application data (mutable application data) stored on the first datastore and a background copy of the immutable application data stored on the second datastore is initiated. In some embodiments, initiating the background copy of the immutable application data stored on the second datastore includes obtaining a list of files (e.g., a file listing) containing the immutable application data stored on the second datastore to include in the point-in-time backup and providing the list to a process that performs the background copy of the immutable application data. The process preforming the background copy uses the list to identify the files to include in a point-in-time copy of the files. In some embodiments, the list is maintained on the first datastore to indicate a current state of the immutable application data stored on the second datastore. The list can comprise a manifest of an LSMT that provides indexed access to the immutable application data stored on the second datastore. In other embodiments, the list is maintained on the second datastore, and the suspension of delete operations at the second datastore includes suspending deletion of the list so that the list can be captured with the point-in-time copy of the files. Preserving the list allows the information in the list to be used at later time to restore the application to the point-in-time of the backup, if needed.

In operation 608, a resumption of the write operations at the first datastore and the second datastore is initiated in response to completion of the snapshot. In some embodiments, initiating the resumption of the write operations includes initiating the resumption of the write operations during performance of the background copy of the immutable application data to allow application input/output to resume.

In operation 610, a resumption of the delete operations at the second datastore is initiated in response to completion of the background copy of the immutable application data. In some embodiments, resumption of the delete operations at the second datastore includes performing a catchup process that deletes immutable application data that is replaced by updated immutable application data written to the second datastore during performance of the background copy.

The methods described above can be performed by a computer (e.g., computer 701 in FIG. 7), performed in a cloud environment (e.g., clouds 706 or 705 in FIG. 7), and/or generally can be implemented in fixed-functionality hardware, configurable logic, logic instructions, etc., or any combination thereof. In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the disclosed methods, such as computer code for an application backup/restore module in block 750. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 721 and the other storage media discussed below. The computer readable program instructions, and associated data, are accessed by processor set 710 to control and direct performance of the disclosed methods. In computing environment 700, at least some of the instructions for performing the disclosed methods may be stored in block 750 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid-state storage devices. Operating system 722 may take several forms, such as various known proprietary operating systems or open-source Portable Operating System Interface type operating systems that employ a kernel. The code included in block 750 typically includes at least some of the computer code involved in performing the disclosed methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the disclosed methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. It is also to be understood that the terms "approximately" or "substantially" as used herein with regard to times and other process parameters, etc., are meant to denote being close or approximate to, but not exactly. For example, the term "approximately" or "substantially" as used herein implies that a small margin of error is present, e.g., ±0.2%, ±0.5%, ±1%, etc.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A system comprising:
   one or more computer readable storage media storing program instructions and one or more processors which, in response to executing the program instructions, are configured to:
   create a point-in-time backup of application data stored on both a first datastore and a second datastore, wherein the application data stored on the second datastore is immutable application data,
   wherein the program instructions that create the point-in-time backup cause the one or more processors to:
   initiate a snapshot of the first datastore;
   initiate a suspension of delete operations at the second datastore to preserve the immutable application data stored on the second datastore;
   initiate a background copy of the second datastore; and
   initiate a resumption of the delete operations at the second datastore in response to completion of the background copy of the second datastore.

2. The system of claim 1, wherein the program instructions are further configured to cause the one or more processors to:
   initiate suspension of write operations at the first datastore and the second datastore; and
   initiate resumption of the write operations at the first datastore and the second datastore in response to completion of the snapshot of the first datastore.

3. The system of claim 2, wherein the program instructions configured to cause the one or more processors to initiate the resumption of the write operations are further configured to cause the one or more processors to:
   initiate the resumption of the write operations during performance of the background copy of the immutable application data to allow application input/output to resume.

4. The system of claim 1, wherein the program instructions configured to cause the one or more processors to initiate the background copy of the immutable application data are further configured to cause the one or more processors to:
   obtain a list of files containing the immutable application data stored on the second datastore to include in the point-in-time backup; and
   provide the list to a backup service that performs the background copy of the immutable application data.

5. The system of claim 4, wherein the list is maintained on the first datastore to indicate a current state of the immutable application data stored on the second datastore.

6. The system of claim 4, wherein the list comprises a manifest of a log-structured merge tree (LSMT) that provides indexed access to the immutable application data stored on the second datastore.

7. The system of claim 4, wherein the list is maintained on the second datastore, and wherein the suspension of delete operations at the second datastore includes suspending deletion of the list.

8. The system of claim 1, wherein the program instructions configured to cause the one or more processors to initiate the resumption the delete operations at the second datastore are further configured to cause the one or more processors to:
   initiate a catchup process that deletes obsolete immutable application data that has been replaced by new immutable application data written to the second datastore during performance of the background copy.

9. The system of claim 1, wherein the program instructions are further configured to cause the one or more processors to perform a point-in-time recovery of the application data using the point-in-time backup of the application data,
   wherein the point-in-time recovery includes:
   initiating restoration of the first datastore from the snapshot; and
   initiating restoration of the second datastore from a copy created by the background copy.

10. A computer-implemented method, comprising:
    creating a point-in-time backup of application data stored on both a first datastore and a second datastore, wherein the application data stored on the second datastore is immutable application data,
    wherein creating the point-in-time backup includes:
    initiating a suspension of write operations at the first datastore and the second datastore;

initiating a suspension of delete operations at the second datastore to preserve the immutable application data stored on the second datastore;

initiating a snapshot of the first datastore and a background copy of the second datastore;

initiating resumption of the write operations at the first datastore and the second datastore in response to completion of the snapshot of the first datastore; and initiating resumption of the delete operations at the second datastore in response to completion of the background copy of the second datastore.

11. The computer-implemented method of claim 10, wherein initiating the resumption of the write operations further comprises:
  initiating the resumption of the write operations during performance of the background copy of the immutable application data to allow application input/output to resume.

12. The computer-implemented method of claim 10, wherein initiating the background copy of the immutable application data further comprises:
  obtaining a list of files containing the immutable application data stored on the second datastore to include in the point-in-time backup; and
  providing the list to a backup service that performs the background copy of the immutable application data.

13. The computer-implemented method of claim 12, wherein the list is maintained on the first datastore to indicate a current state of the immutable application data stored on the second datastore, and wherein the list comprises a manifest of a log-structured merge tree (LSMT) that provides indexed access to the immutable application data stored on the second datastore.

14. The computer-implemented method of claim 12, wherein the list is maintained on the second datastore, and wherein the suspension of delete operations at the second datastore includes suspending deletion of the list.

15. The computer-implemented method of claim 10, wherein initiating the resumption the delete operations at the second datastore further comprises:
  initiating a catchup process that deletes obsolete immutable application data that has been replaced by new immutable application data written to the second datastore during performance of the background copy.

16. A computer program product comprising:
  one or more computer readable storage media, and program instructions collectively stored on the one or more computer readable storage media, the program instructions configured to cause one or more processors to:
  create a point-in-time backup of application data stored on both a first datastore and a second datastore, wherein the application data stored on the second datastore is immutable application data,
  wherein creating the point-in-time backup includes:
  initiating a suspension of write operations at the first datastore and the second datastore;
  initiating a suspension of delete operations at the second datastore to preserve the immutable application data stored on the second datastore;
  initiating a snapshot of the first datastore and a background copy of the second datastore;
  initiating resumption of the write operations at the first datastore and the second datastore in response to completion of the snapshot of the first datastore; and
  initiating resumption of the delete operations at the second datastore in response to completion of the background copy of the second datastore.

17. The computer program product of claim 16, wherein the program instructions configured to cause the one or more processors to initiate the resumption of the write operations are further configured to cause the one or more processors to:
  initiate the resumption of the write operations during performance of the background copy of the immutable application data to allow application input/output to resume.

18. The computer program product of claim 16, wherein the program instructions configured to cause the one or more processors to initiate the background copy of the immutable application data are further configured to cause the one or more processors to:
  obtain a list of files containing the immutable application data stored on the second datastore to include in the point-in-time backup; and
  provide the list to a backup service that performs the background copy of the immutable application data.

19. The computer program product of claim 18, wherein the list is maintained on the first datastore to indicate a current state of the immutable application data stored on the second datastore, and the list comprises a manifest of a log-structured merge tree (LSMT) that provides indexed access to the immutable application data stored on the second datastore.

20. The computer program product of claim 16, wherein the program instructions configured to cause the one or more processors to initiate the resumption the delete operations at the second datastore are further configured to cause the one or more processors to:
  initiate a catchup process that deletes obsolete immutable application data that has been replaced by new immutable application data written to the second datastore during performance of the background copy.

* * * * *